(12) United States Patent
Lemkin

(10) Patent No.: US 7,229,265 B1
(45) Date of Patent: Jun. 12, 2007

(54) MOLD LOCK WITH LUBRICATING GROOVES

(76) Inventor: Jack Lemkin, 37 Meadowlark La., Columbus, OH (US) 43214

( * ) Notice: Subject to any disclaimer, the term of this patent is extended or adjusted under 35 U.S.C. 154(b) by 0 days.

(21) Appl. No.: 11/505,444

(22) Filed: Aug. 17, 2006

(51) Int. Cl.
B29C 45/83 (2006.01)

(52) U.S. Cl. .................. 425/107; 425/190; 425/472; 425/595

(58) Field of Classification Search ................ 425/107, 425/190, 451.9, 595, 472
See application file for complete search history.

(56) References Cited

U.S. PATENT DOCUMENTS

| | | | |
|---|---|---|---|
| 4,678,158 A | | 7/1987 | Brock |
| 4,750,876 A | * | 6/1988 | Lawson ...................... 425/406 |
| 5,662,946 A | | 9/1997 | Pratt et al. |
| 5,762,977 A | | 6/1998 | Boskovic |
| 6,328,552 B1 | * | 12/2001 | Hendrickson et al. ...... 425/190 |
| 6,921,256 B2 | * | 7/2005 | Bokich ........................ 425/190 |
| 6,953,331 B2 | * | 10/2005 | Bokich ..................... 425/451.9 |
| 6,981,858 B2 | | 6/2006 | Wieder |

OTHER PUBLICATIONS

National Tool and Manufacturing Co.—Products—Side Locks—Apr. 19, 2006.
PCS Company—Side Locks Positive Alignment System, undated.
D-M-E Standard—Straight Side Interlocks, undated.
Progressive Components—Side Locks and Top Locks; pp. 31 and 33, undated.
IEM Ltd.—Series KB-10—Small Cam Slide Gibs; Oct. 1992.
Sinitron Catalog (pp. 1-7), undated.

* cited by examiner

Primary Examiner—James P. Mackey
(74) Attorney, Agent, or Firm—Hoffman, Wasson & Gitler, P.C.

(57) ABSTRACT

A mold for maintaining alignment between mold halves despite a thermal differential between the mold halves. The lock comprises (1) a T-shaped member, consisting of an enlarged, rectangular head and a tongue extending therefrom, and (2) a receptacle with an outwardly opening U-shaped pocket to receive the tongue of the T-shaped member, when the mold halves are pressed together. A vertical conduit is formed in the head and tongue of the T-shaped member, and a horizontal channel, extending through the tongue, intersects the lower end of the conduit. At lest one groove is defined in each side wall of the conduit. A grease fitting is located in a blind hole in the head of the T-shaped member, so that lubricant flows through the vertical conduit, into the horizontal channel, and into the grooves in the opposite side walls of the tongue. The grooves are usually formed in pairs, and are configured in an intersecting X configuration. The midpoint of the X configuration corresponds to one end of the horizontal channel in the receptacle. The grease fitting, vertical conduit, horizontal channel, and grooves in the opposite side walls of the tongue deliver a film of lubricant into the limited clearances between the side walls of the tongue and the interior walls of the pocket to prevent metal-to-metal, line-to-line contact therebetween. In an alternative embodiment, the grooves are located in the parallel side walls of the U-shaped pocket, and are configured in an intersecting X configuration, to deliver the film of lubricant.

12 Claims, 5 Drawing Sheets

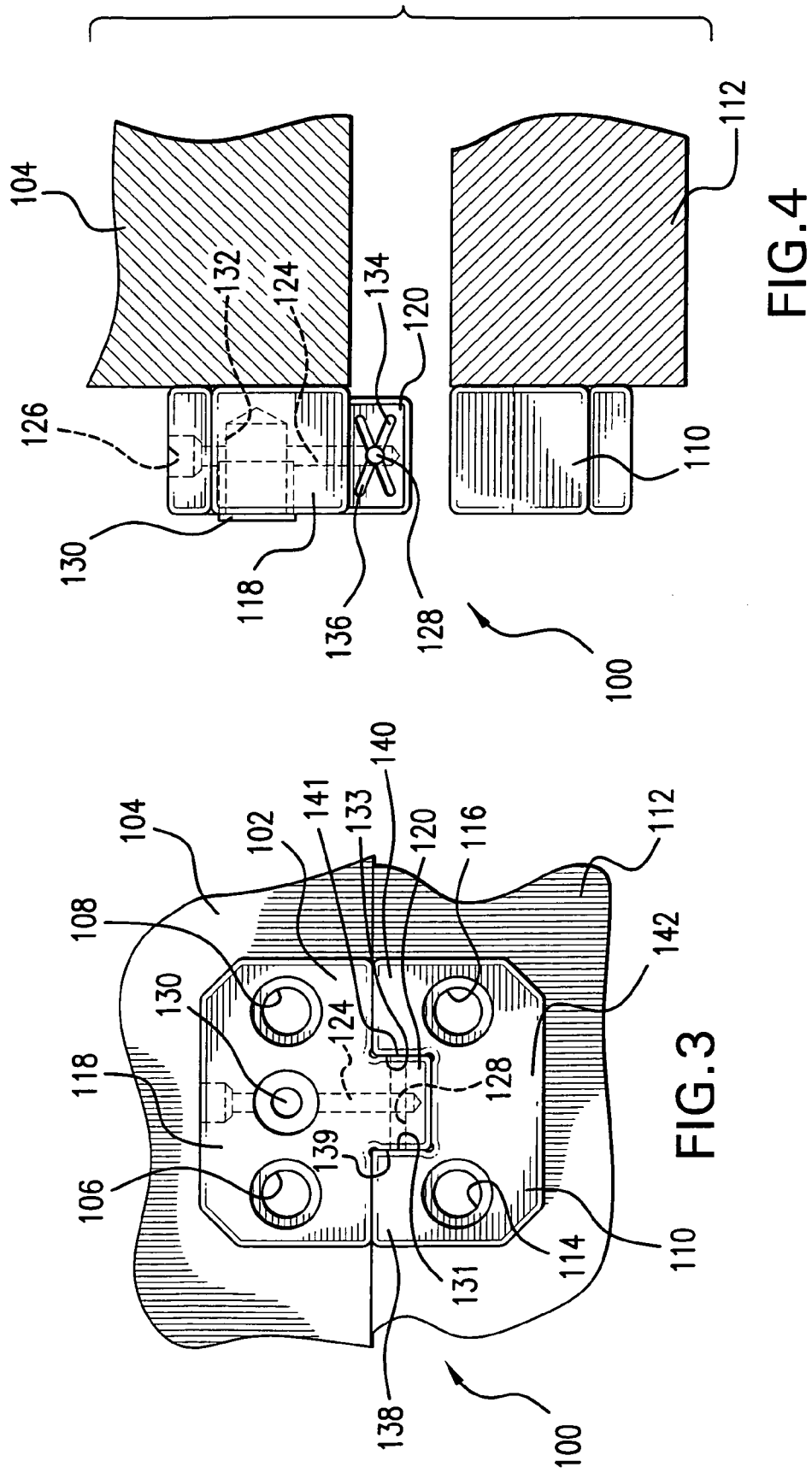

MOLD LOCK WITH LUBRICATING GROOVES

The present invention pertains generally to mold locks for maintaining alignment between mold halves, and more particularly to grooves defined within the mold lock for supplying a lubricating film between contacting metal surfaces within the mold lock.

BACKGROUND OF THE INVENTION

Injection molds are used to form a variety of objects from plastic materials. The molds usually consist of two halves, which are aligned by leader pins and bushings. A die fits within a cavity defined between the two halves of the mold. A representative mold is shown in U.S. Pat. No. 5,662,946, to Steven D. Pratt et al; the first or fixed mold half 102 and the movable mold half 109 are shown in FIG. 1 of the Pratt et al patent. Leader pins 114, that fit into corresponding bushings 116, are also depicted, and side-locks 128, 129 assist in the alignment, and registration, of the two mold halves during molding.

As the mold in Pratt et al closes, the initial alignment of the mold halves occurs as leader pins 114 enter bushings 115. However, as the mold is operated, at high speeds, during extended production runs, the alignment of the two halves of the mold degrades and becomes less accurate. Side locks 128, 129 start to wear and are unable to fully compensate for the reduced accuracy, and the mold loses its ability to produce products within acceptable tolerances.

In order to maintain more precise alignment between the mold halves of injection molds than can be provided by leader pins and cooperating bushings, improved mold locks were developed. Many of the mold locks relied upon the coaction of a T-shaped member with a U-shaped receptacle. The T-shaped member is secured to one mold half, while the U-shaped member is secured to the cooperating mold half.

The T-shaped member comprises a horizontally extending head with an extending tongue. The U-shaped member includes an upwardly opening pocket that receives the tongue. The sides of the tongue are parallel to one another, and the side walls of the upwardly opening pocket are parallel to one another. Minimal clearance, in the order of 0.0002 to 0.0004 inches, is provided between the sides of the tongue and the side walls of the receptacle. The mold locks are installed in the mold so that the adjacent, alignment surfaces of the tongue and receptacle are parallel to the direction of thermal expansion of the mold halves.

U.S. Pat. No. 5,762,977, granted Jun. 9, 1998 to Borislav Boskovic, discloses a mold lock employing a T-shaped member that cooperates with a receptacle with a U-shaped pocket to receive the tongue of the T-shaped member. Boskovic discloses lock 16 for guiding, and aligning, two mating parts 12, 14 of mold 10; the mold would usually include a core and a cavity to form a specific article. The lock comprises guide member 18 having a socket, or U-shaped pocket 22, and a locking member 20, which is shaped to be engaged in the pocket, as shown in FIG. 3.

Boskovic improved upon previous mold locks by providing a self purging feature for the purging of foreign material, from the socket or receptacle, when the locking member and socket are engaged. The self-purging feature assumed the form of sloped wall 30 in cavity 28, shown in FIGS. 4 and 5, and described in column 2, lines 51–60, of the Boskovic patent. Typically, four of the locks are utilized for each mold, with one lock secured to each side of the mold, as shown in FIG. 2.

Several embodiments of a mold lock are shown in U.S. Pat. No. 6,981,858, granted Jan. 3, 2006, to Klaus A. Wider. In the preferred embodiment of FIGS. 1–5, the mold interlocking device includes first portion 22 attached to mold half 24. The first portion includes head 50 with channel 66 that receives a cylindrical pin or roller 68, as shown in FIGS. 1 and 3; the head is received in pocket 30 of receptacle 26 that is secured to cooperating mold half 28, as shown in FIG. 4. Inserts may include rollers, plates, plates with lubricating plugs, and plates comprised of layers.

However, all mold locks are subject to wear, which reduces their accuracy over time. In order to minimize wear, mold locks are frequently made from high grade hardened alloy steel, and are coated with wear resistant surfaces, such as titanium nitride. Nonetheless, known mold locks suffer from the same problem, namely dry unlubricated metal surfaces rubbing against each other, resulting in wear and galling.

The rubbing interaction of dry, contacting surfaces may be compounded by inaccuracies in machining the U-shaped pocket in the receptacle of the mold lock, coupled with the nominal clearance, between wear surfaces, of 0.0002 to 0.0004 inches. Consequently, the fit between the T-shaped member and the U-shaped pocket in the receptacle may result in line-to-line contact of the metal surfaces.

SUMMARY OF THE INVENTION

With the shortcomings of known mold locks clearly in mind, the inventor has devised a mold lock with the ability to supply a lubricating film to the walls of the mold lock to prevent, or at last significantly reduce, the harmful line-to-line metal contact. The tongue of the T-shaped member is drilled clear-through, so that a horizontal channel extends between the opposite side walls of the tongue. One end of the channel communicates with lubricating grooves in one side wall of the tongue, while the other end of the channel communicates with lubricating grooves in the other side wall of the tongue.

A vertical conduit is formed in the head and tongue of the T-shaped member. A plug seals the upper end of the conduit, and the lower end of the conduit terminates in the horizontal channel.

A blind hole is drilled in the front face of the head of the T-shaped member; the hole extends part-way through the head. A grease fitting fits into the blind hole, and intersects the vertical conduit.

At least one groove is defined in each side wall of the tongue of the T-shaped member. Preferably, two or more intersecting grooves may be defined in each side wall of the tongue of the T-shaped member; the intersection point is located in communication with one end of the horizontal channel.

The grooves extend to a minimum width of one half of the width of the side walls of the tongue, and are oriented in a range of 20°–70° from the direction of travel of the tongue.

While the preferred embodiment of the inventors mold lock relies upon intersecting grooves in the side walls of the tongue of the T-shaped member, the grooves may be located in the side walls of the U-shaped pocket of the receptacle of the mold lock, and function satisfactorily. The grooves in the side walls of the pocket of the receptacle may be employed in lieu of the grooves in the tongue, or may be used in addition to the grooves in the tongue of the T-shaped member of the mold lock.

Yet other refinements to the invention will become apparent from considering the appended drawings in harmony with the following specification.

BRIEF DESCRIPTION OF THE DRAWINGS

FIG. 3 is a front elevational view of the preferred embodiment of the inventor's unique mold lock;

FIG. 4 is an exploded, side elevational view of the mold lock of FIG. 3;

DETAILED DESCRIPTION OF THE INVENTION

Figure 1:
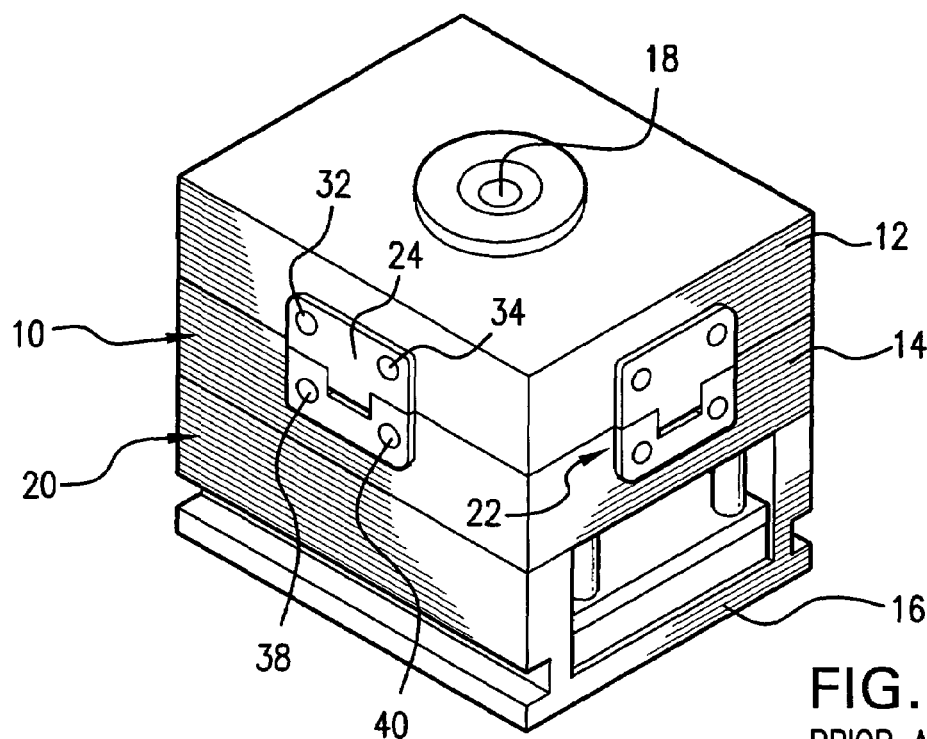
FIG. 1 is a perspective view of a mold utilizing mold locks; the legend PRIOR ART indicates that the mold locks are of conventional design.
Figure 2:
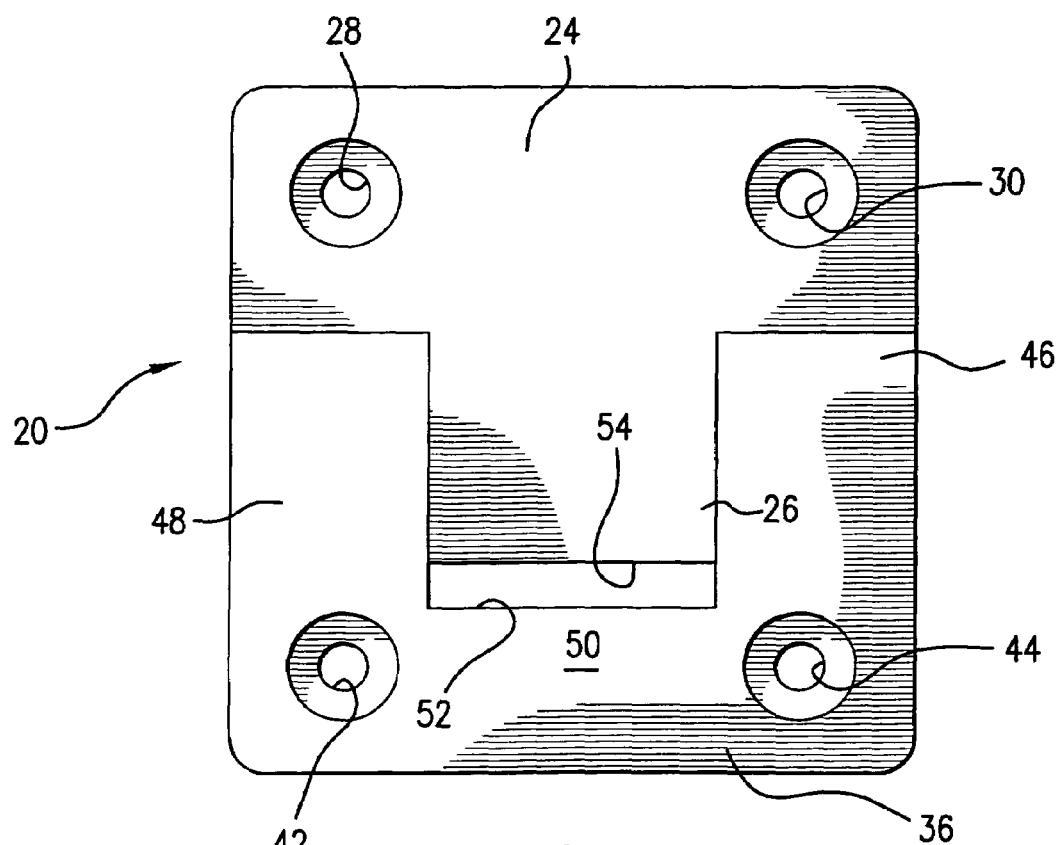
FIG. 2 is a front elevational view of one of the mold locks of FIG. 1, on an enlarged scale; the legend PRIOR ART indicates that the mold lock is of conventional design.

FIGS. 1 and 2, designated as PRIOR ART, show a conventional mold assembly 10, comprising a first mold half 12, a second cooperating mold half 14, and a base 16 for supporting the mold halves. An injection port 18 in first mold half 12 introduces the molten plastic into the interior of the mold assembly, and a die in the cavity (not shown) defined in the interior of the mold determines the shape of the object being molded. The mold halves are movable relative to one another, so that the cavity is sealed during the molding process, but are separated so that the molded object can be removed at the end of the molding process.

In order to maintain the mold halves in alignment, despite the considerable pressure exerted upon the mold halves, and the thermal differential between the first and second mold halves, which can approach 20° F., mold locks are employed on each side of the mold assembly 10. Mold locks 20, 22 are shown in FIG. 1 and additional mold locks (not shown) are employed on the other two faces of the mold assembly. The mold locks are identical in structure and function.

FIG. 2 shows known mold lock 20 on an enlarged scale; mold lock 20 comprises a T-shaped member with a rectangular head 24 and an extending or depending tongue 26. Apertures 28, 30 receive fasteners 32, 34 to secure T-shaped member 24 to mold half 12; the lower edge of head 24 is aligned with the parting line between the mold halves.

Receptacle 36 is secured to mold half 14 by fasteners 38, 40 that are passed through apertures 42 and 44. Upstanding legs 46, 48 are joined together by base 50; the legs and base define a U-shaped pocket 52 in receptacle 36. The U-shaped pocket opens upwardly to receive tongue 26 on T-shaped member 24. The underside of the head of T-shaped member 24 rests upon the upper surface of legs 46, 48 of the receptacle, while tongue 26 extends downwardly into pocket 52 and contacts the interior surfaces of legs 46, 48. Gap 54 separates the lower end of tongue 26 from contact with the upper surface of base 50.

FIGS. 3–6C illustrate the preferred embodiment of the inventor's unique mold lock, indicated generally by the reference numeral 100. The upper, T-shaped member 102, of mold lock 100, is secured to mold half 104, by fasteners (not shown) which pass through apertures 106, 108. Cooperating receptacle 110 is secured to mold half 112 by fasteners (not shown) which pass through apertures 114, 116. The contact between the cooperating members of mold lock 100 occurs along the parting line between mold halves 104 and 112.

T-shaped member 102 comprises an enlarged, generally rectangular head 118 and an extending tongue 120. A vertical conduit 124 is drilled, or otherwise formed, about the midline of T-shaped member 102. Conduit 124 extends from the upper surface of head 118 into tongue 120. Plug 126 seals the upper end of conduit 124, and the lower end of conduit 124 intersects horizontal channel 128, as indicated in FIG. 3. Horizontal channel 128 extends through depending tongue 120.

Grease fitting 130 fits snugly into the opening of blind hole 132 in head 118 of T-shaped member 102. A mold lubricant, which may include tackifying additives, is introduced into the mold lock via fitting 130, vertical conduit 124, and horizontal channel 128. The mold lubricant passes through channel 128 to the outer, exposed surfaces of the side walls of tongue 120.

Grooves 134, 136, on both side walls 131, 133 of tongue 120, intersect with opposite ends of horizontal channel 128, as shown in FIGS. 4 and 6A, 6B, and 6C, and distribute a lubricating film between the contacting surfaces on the opposite side walls of tongue 120 and the side walls of the U-shaped pocket in cooperating receptacle 110. The lubricating film prevents, or at least minimizes, the metal-to-metal, line-to-line, contact that leads to premature wear and galling in known mold locks.

Figure 6C:
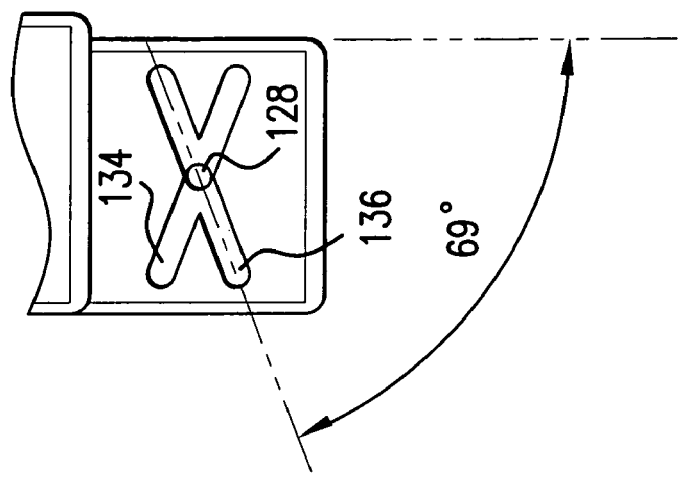
FIGS. 6A, 6B and 6C show different configurations of the lubricating grooves formed in the sides of the tongue of the T-shaped member of the inventor's mold lock.
Figure 6A:
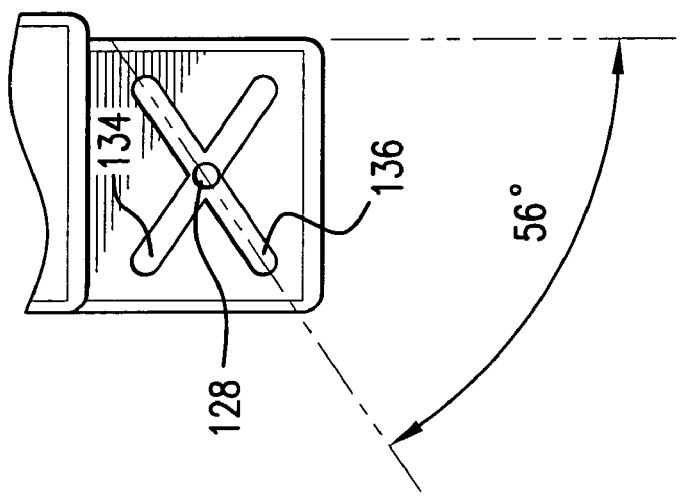
Figure 6B:
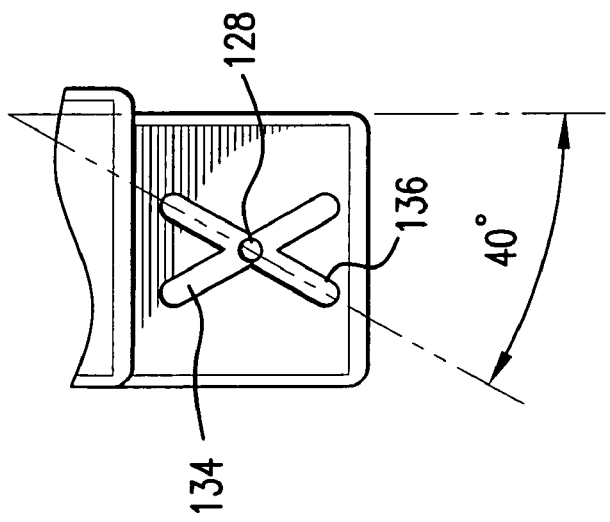

FIGS. 6A, 6B and 6C depict different angular orientations for grooves 134, 136 which function satisfactorily under harsh, field conditions. The grooves may be located at different angular positions, with regard to the direction of travel for tongue 120; the grooves may be oriented within a range of 20°–70° from the face of the tongue. The grooves must extend to a minimum width of one half of the width of the side walls of tongue 120 in order to function satisfactorily.

Figure 5:
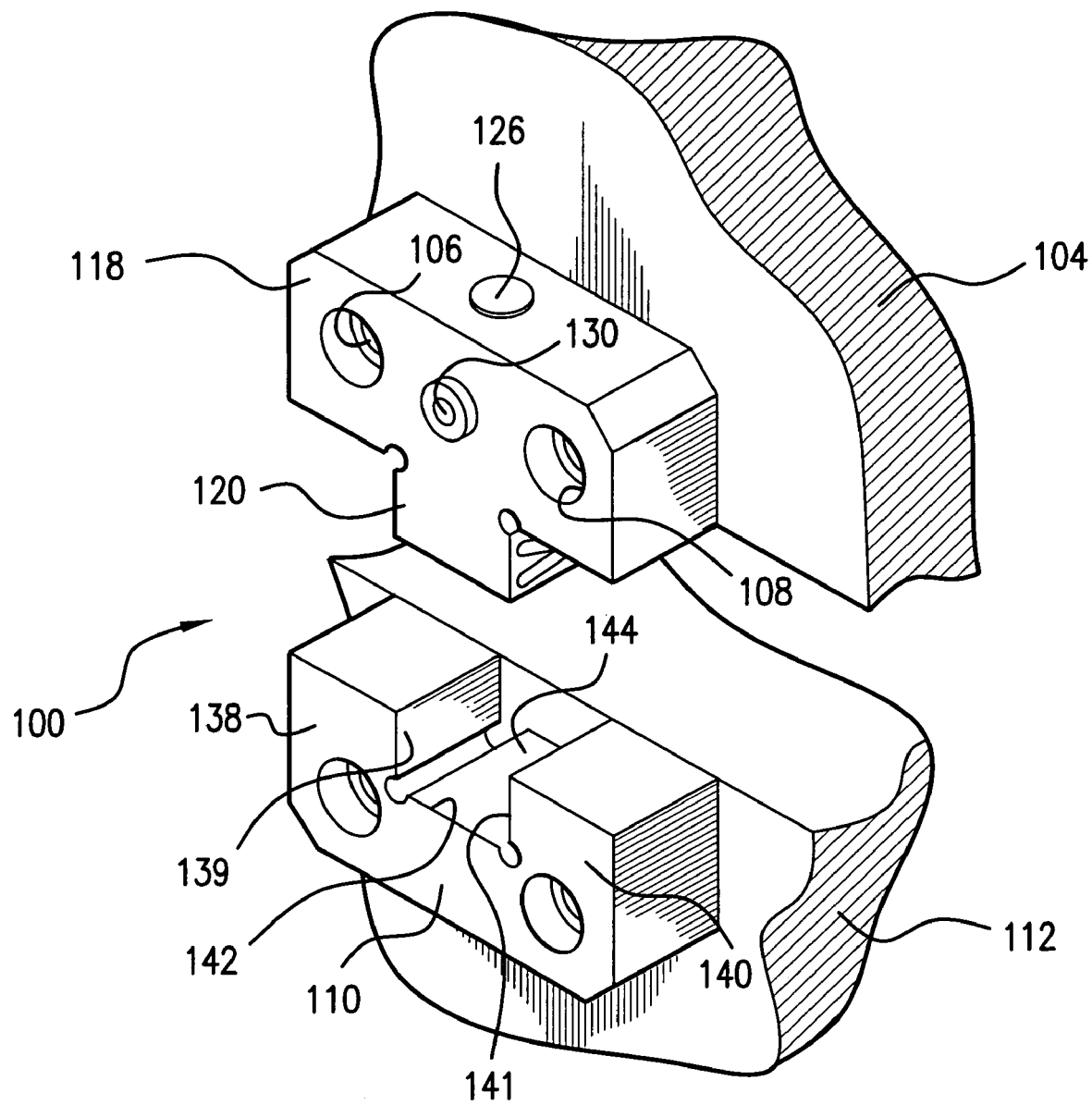
FIG. 5 is an exploded, perspective view of the mold lock of FIG. 3.

Cooperating receptacle 110 comprises upstanding parallel legs 138, 140 are joined together by base 142. The interior surfaces of legs 138 and 140 define parallel side walls 139, 141. The legs and base define U-shaped pocket 144 in receptacle 110. The U-shaped pocket opens upwardly to receive tongue 120 on T-shaped member 102. The underside of the head of T-shaped member 102 rests upon the upper surfaces of legs 138, 140, while tongue 120 extend downwardly into pocket 144, and contacts the side walls 139, 141 of legs 138, 140, as shown in FIGS. 3 and 5. The lubricating film prevents the undesirable metal-to-metal, line-to-line contact, between the contacting surfaces.

Figure 7:
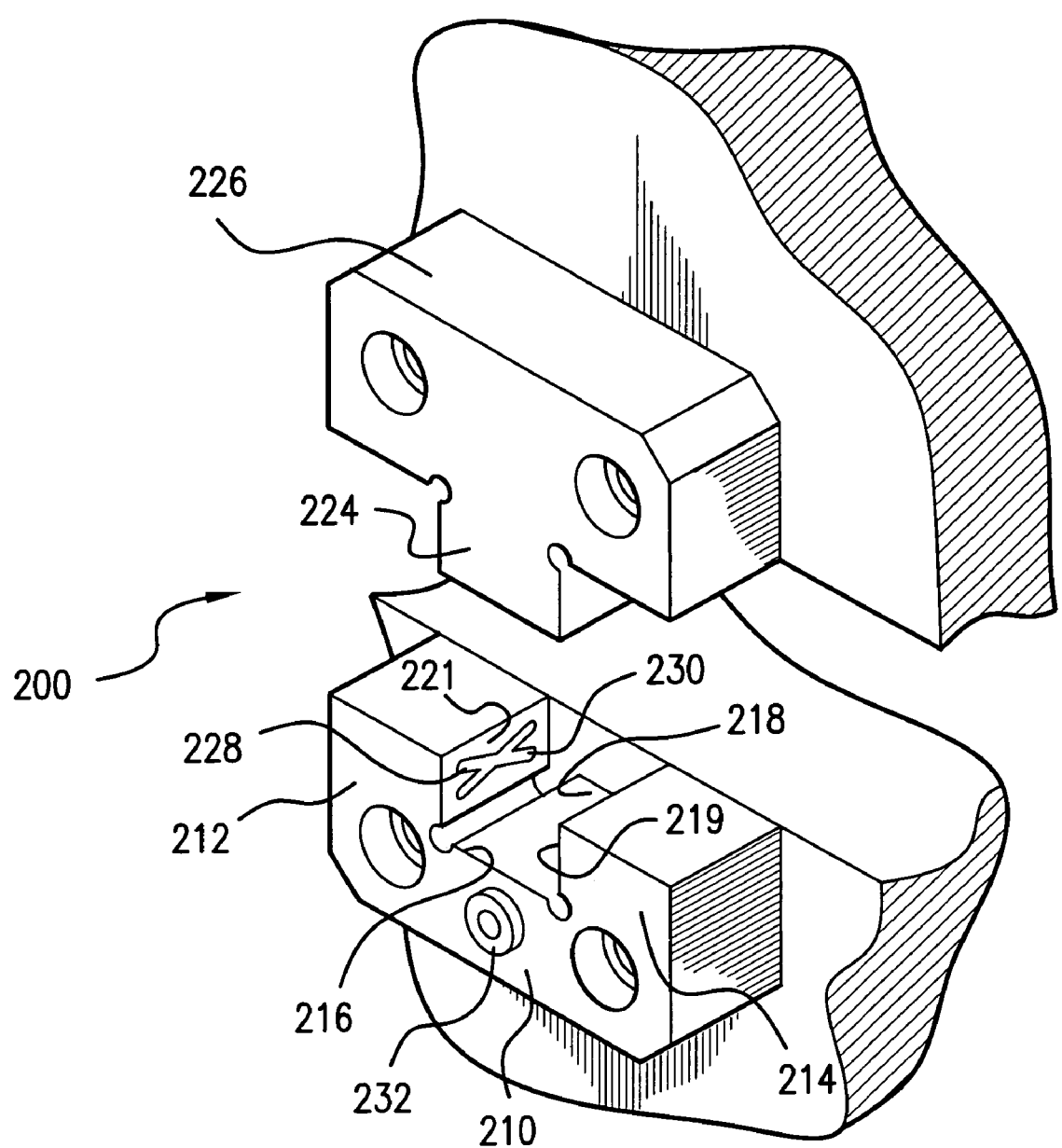
FIG. 7 is a perspective view of an alternative embodiment of the inventor's unique mold lock.

FIG. 7 shows an alternative embodiment 200 of the mold lock, wherein cooperating receptacle 210 comprises upstanding parallel legs 212, 214 joined together by base 216; the legs and base define U-shaped pocket 218 in receptacle 210. The interior surfaces of legs 212, 214 define parallel side walls 219 and 221. The U-shaped pocket opens upwardly to receive tongue 224 on a T-shaped member 226 to complete the mold lock. Interacting grooves 228, 230 are defined in the side walls of the parallel legs 212, 214 of pocket 218.

Grooves 228, 230 are oriented angularly relative to one another to form an intersecting, or X, configuration. The intersection is fed with lubricant from a source, such as fitting 232, and the lubricant is retained, and distributed, along the length of the grooves 228, 230, as a film of lubricant. The film of lubricant prevents, or at least minimizes line-to-line contact between the metal surfaces on the side walls of the extending tongue of the mold lock and the adjacent side walls of the U-shaped pocket in the receptacle of the mold lock.

Modifications and revisions of the inventor's unique mold lock will undoubtedly occur to the skilled artisan. Intersecting grooves could be formed in the tongue of the T-shaped member and in the side walls of the U-shaped pocket in the receptacle. Consequently, the appended claims should be broadly construed, in harmony with the spirit and scope of the invention, and should not be limited to their literal terms.

I claim:

1. A mold lock for maintaining alignment between first and second mold halves, said mold lock comprising:
    a) T-shaped member including a rectangular head, and a tongue with spaced parallel side walls, extending from said head,
    b) means for securing said T-shaped member to said first mold half,
    c) a receptacle comprising a pair of spaced parallel legs, the interior surfaces of said legs defining parallel side walls, and a base extending between said legs to define an outwardly opening U-shaped pocket,
    d) means for securing said receptacle to said second mold half, in alignment with said T-shaped member,
    e) said U-shaped pocket being slightly larger in size than said tongue of said T-shaped member, so that said tongue can be seated within said pocket when the mold halves are pressed together,
    f) groove means for retaining and distributing lubrication in the spaced parallel walls of said mold lock,
    g) said groove means comprising at least two grooves that intersect in said side walls of said mold lock,
    h) said grooves being angularly oriented relative to one another to form an X-shaped intersection, and
    I) means for introducing lubricant into said mold lock and conducting same into said groove means to provide a film of lubricant between said side walls of said tongue and said side walls of said receptacle.

2. A mold lock as defined in claim 1, wherein said grooves extend to a minimum width of one half of the width of the said side walls of said mold lock.

3. A mold lock as defined in claim 2, wherein said grooves are oriented relative to one another over a range of 20°–70°, relative to the direction of travel of said mold lock.

4. A mold lock for maintaining alignment between first and second mold halves, said mold lock comprising:
    a) T-shaped member including a rectangular head, and a tongue, with spaced parallel side walls, extending from said head,
    b) means for securing said T-shaped member to said first mold half,
    c) a receptacle including a U-shaped pocket,
    d) means for securing said receptacle to said second mold half, in alignment with said T-shaped member,
    e) said U-shaped pocket being slightly larger in size than said tongue of said T-shaped member, so that said tongue can be seated within said pocket when the mold halves are pressed together,
    f) a vertical conduit formed within said T-shaped member, said conduit extending through said head and into said tongue of said T-shaped member,
    g) a horizontal channel extending through said side walls of said tongue and intersecting said vertical conduit,
    h) groove means for retaining and distributing lubrication formed in each of said side walls of said tongue of said T-shaped member,
    I) said groove means communicating with said horizontal channel,
    j) means in said head of said T-shaped member for delivering lubrication to said vertical conduit, which flows through said vertical conduit and through said horizontal channel into said grooves, thereby delivering a lubricating film between said U-shaped pocket and said parallel side walls of said tongue seated therein.

5. A mold lock as defined in claim 4, wherein said means in said head of said T-shaped member comprises a blind hole extending from the front face of said head toward the rear of said head, and a grease fitting inserted into said blind hole.

6. A mold lock as defined in claim 5, wherein said blind hole intersects said vertical conduit near the upper end of said conduit.

7. A mold lock as defined in claim 4, wherein a plug fits into the upper end of said vertical conduit to seal same.

8. A mold lock as defined in claim 4, wherein said groove means comprises at least two grooves that intersect at the end of said horizontal channel in each side wall of said tongue.

9. A mold lock as defined in claim 8, wherein said grooves are angularly oriented relative to one another to form an X-shaped intersection, and said horizontal channel communicates with said grooves at said intersection.

10. A mold lock as defined in claim 8, wherein said grooves extend to a minimum width of one half of the width of the side walls of said tongue.

11. A mold lock as defined in claim 8, wherein said grooves may be oriented relative to one another over a range of 20°–70° relative to the direction of travel of said tongue.

12. A mold lock for maintaining alignment between first and second mold halves, said mold lock comprising:
    a) T-shaped member including a rectangular head, and a tongue with spaced parallel side walls, extending from said head,
    b) means for securing said T-shaped member to said first mold half,
    c) a receptacle comprising a pair of spaced parallel legs, the interior surfaces of said legs defining spaced parallel side walls, and a base extending between said legs to define an outwardly opening U-shaped pocket,
    d) means for securing said receptacle to said second mold half, in alignment with said T-shaped member,
    e) said U-shaped pocket being slightly larger in size than said tongue of said T-shaped member, so that said tongue can be seated within said pocket when the mold halves are pressed together,
    f) groove means adapted to retain and distribute lubrication in the space between the parallel side walls of said mold lock,
    g) said groove means comprising at least two grooves that intersect in said side wall of said mold lock,
    h) said grooves being angularly oriented relative to one another to form an X-shaped intersection and being oriented relative to one another over a range of 20°–70° relative to the direction of travel of said mold lock.

* * * * *